United States Patent [19]

Byrne

[11] Patent Number: 5,096,434

[45] Date of Patent: Mar. 17, 1992

[54] ELECTRICAL INTERCONNECTION ASSEMBLY

[76] Inventor: Norman R. Byrne, 2736 Honey Creek, N.E., Ada, Mich. 49301

[21] Appl. No.: 570,879

[22] Filed: Aug. 22, 1990

[51] Int. Cl.⁵ .......................................... H01R 27/02
[52] U.S. Cl. ................................... 439/215; 439/505; 439/654
[58] Field of Search .................. 439/207, 209–216, 439/502, 505, 650–655

[56] References Cited

U.S. PATENT DOCUMENTS

| | | | |
|---|---|---|---|
| Re. 31,733 | 11/1984 | Haworth et al. | 339/22 R |
| 4,043,626 | 8/1977 | Propst et al. | 339/22 R |
| 4,135,775 | 1/1979 | Driscoll | 339/22 R |
| 4,239,932 | 12/1980 | Textoris et al. | 339/22 R |
| 4,241,965 | 12/1980 | Wilson et al. | 339/22 R |
| 4,270,020 | 5/1981 | Kenworthy et al. | 439/215 |
| 4,295,697 | 10/1981 | Grime | 439/215 |
| 4,313,646 | 2/1982 | Millhimes et al. | 439/654 |
| 4,382,648 | 5/1983 | Propst et al. | 339/22 R |
| 4,579,403 | 4/1986 | Byrne | 339/9 E |
| 4,740,167 | 4/1988 | Millhimes et al. | 439/654 |
| 4,775,328 | 10/1988 | McCarthy | 439/215 |
| 4,990,110 | 2/1991 | Byrne | 439/861 |
| 5,013,252 | 5/1991 | Nienhuis et al. | 439/215 |

OTHER PUBLICATIONS

Product brochure of AMP Special Industries, Valley Forge, Pa., No. 4-404845-4.

Primary Examiner—Gary F. Paumen
Attorney, Agent, or Firm—Varnum, Riddering, Schmidt & Howlett

[57] ABSTRACT

An electrical junction assembly for use in the wall panels of a space-divider wall system includes a junction block having several receptacle connectors to provide a plurality of electrical outlets on both sides of a wall panel. The junction block is connected by means of conduits extending from both ends of the junction block to oppositely directed connector blocks for connection to adjoining panels. This assembly of junction block and connector blocks allows electrical power to be supplied to one end of the panel and conducted to and through the junction block to other panels. The receptacle connectors on the junction block each have one type of terminal configuration, e.g., a female electrical terminal configuration and one of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are adjoined to a third panel, all at one point, the arrangement of this invention allows the male connector block to be connected to the female connector block of one of the other two panels and the male connector of the other of the other two panels may be connected to one of the receptacle connectors of the junction block on either of the other two panels, in order to establish a three-way interconnection arrangement. In a similar fashion, a fourth, or other additional panels may be added to the junction and plug into receptacle outlets of other panels in order to provide an arrangement of panels that is totally interconnected, electrically.

7 Claims, 5 Drawing Sheets

ELECTRICAL INTERCONNECTION ASSEMBLY

BACKGROUND OF THE INVENTION

1. Field of the Invention

The invention pertains to electrical interconnection systems and more particularly to such systems for use in distributing electrical power to modular wall panels or the like.

2. Prior Art

Known interior wall systems typically employ prefabricated modular units which are joined together in various configurations to divide a work space into smaller offices or work areas. Generally, such modular wall panels are equipped with raceways, for example along a bottom edge of the modular panels, for housing electrical cabling and junction blocks in order to provide electrical outlets and electrical power connections to adjacent panels. The raceway of a modular wall unit may be provided with a male connector at one end and a female connector at another end and a pair of junction blocks, each provided with electrical outlets, disposed at spaced-apart positions along the raceway. Conduits, extending between the junction blocks and between the connectors and the junction blocks, provide electrical interconnection between these units.

The modular panels of a space-divider system may be configured such that adjacent panels are in a straight line or at various angular positions relative to each other. It is common to configure intersecting walls in such a fashion that three or four modular wall panels intersect at right angles. Each of the panels typically requires electrical outlets, and may require outlets on both sides of the panels. In any event, electrical power has to be provided to all of the panels and often only one of the panels at the multiple panel junction is connected to a power supply source. Under such circumstances, the interconnecting wiring becomes a significant problem, and special modifications may have to be made to power systems of wall panels used in such a configuration. Since interchangeability of the wall panel is highly desirable, such custom modifications are preferably avoided. Furthermore, modification of the panels at the installation site is bothersome and costly.

An example of a prior art system in shown in U.S. Pat. No. 4,382,648 to R. L. Propst et al. (dated May 10, 1983). In that prior art system, mating connectors of opposing panels are engaged when the panels are aligned in a straight line. When the panels are positioned in an intersecting relationship, specially manufactured couplers are used. One type of special coupler is used when the panels are positioned at right angles and another type is used with adjoining panels are arranged at angles other than right angles. Consequently, costly inventory of such special couplers must be maintained. The Propst et al. prior art system uses a double set of connectors comprising a male and a female connector for each electrical conductor to be interconnected. When a single one of these prior art panels intersects two adjacent panels, one of the specially manufactured couplers connects the female terminals to one of the adjacent panels and another of the couplers connects the male terminals to the adjacent panel.

Another example of a prior art system is shown in U.S. Pat. No. 4,135,775 to R. P. Driscoll (dated Jan. 23, 1979). In the system of that patent, each panel is provided with an electrical outlet box in its raceway, and panels of different widths are provided with a pair of female connectors, and outlet boxes of adjacent panels are interconnected by means of flexible cables having male connectors at both ends. When three or four panels are adjoined in an intersecting arrangement, two cables may be connected to the pair of female connectors at one end of an outlet box in order to facilitate connection of two adjacent panels.

Other than in the special intersecting relationship, one half of the double set of terminals of these prior systems are superfluous. This is a distinct disadvantage in modern-day systems where several independent electrical circuits are needed in wall panel systems, each requiring separate connectors, while space for such circuits and their connectors is very limited in the raceway areas of modern, thin-line wall panels.

SUMMARY OF THE INVENTION

These and other problems of the prior art are overcome by means of an interconnecting system comprising a single building block arrangement not requiring any special couplers for intersecting wall panels and in which all existing connectors are available for use in the various different panel configurations. An electrical interconnection assembly in accordance with the present invention comprises an electrical junction block having one or more receptacle connectors formed integral thereto for receiving electrical outlet receptacles and a pair of end connectors electrically connected to the junction block for connection to similar end connectors from adjacent panels. One of the end connectors is of the same type, e.g., female, as the receptacle connector and the other is of the opposite type (e.g., male). The receptacle connectors and the end connectors all comprise the same number of terminals and corresponding terminals of all of the receptacle connectors are interconnected with each other and with corresponding terminals of the end connectors. Advantageously, the male end connector of one panel may be connected to the female end connector of an adjacent panel or one of the receptacle connectors of the adjacent panel. In one specific embodiment, the receptacle and end connectors have eight terminals each representing at least three separable electrical circuits. Advantageously, all of the circuits are available for connection at each receptacle terminal and the selected circuit to be used for each receptacle is determined by wiring internal to the outlet receptacles engaging the receptacle connectors of the junction block.

In accordance with one aspect of the invention, one of the end connectors of each panel is connected to the junction block by means of wiring contained in a flexible conduit extending beyond one end of the panel in which the associated junction block is supported and into the raceway of an adjacent panel. In a configuration in which three or more panels are positioned in an intersecting relationship, electrical power can be provided from a first panel to an adjacent panel by engaging the end connector attached to the flexible conduit extending beyond one end of the first panel with one of the receptacle connectors of the junction block of a second panel. The flexible conduit extending beyond one end of the second panel, in turn, may be connected to one of the end connectors of a third adjacent panel in a standard fashion. In this manner, all of the electrical circuits of any of the three panels are made available to the other two. In the event of four intersecting panels, the flexible conduit extending beyond one end of the fourth panel may be engaged with a receptacle connector of any of the other panels to extend all of the electrical circuits of any of the other panels to the fourth panel. In one particular embodiment of the invention, each junction block is a two-sided junction block having two oppositely directed receptacle connectors on each side of the junction block to accommodate four electrical outlet receptacles or any combination of end connectors and receptacles as may be required to obtain a desired interconnection arrangement. Advantageously, corresponding terminals of each of the four receptacle connectors are interconnected internal to the connector block by means of contact blades, each having a single crimped structure to a conductor.

BRIEF DESCRIPTION OF THE DRAWING

An illustrative embodiment of the invention is described in the following detailed description, with reference to the drawing in which.

DETAILED DESCRIPTION

Figure 1:
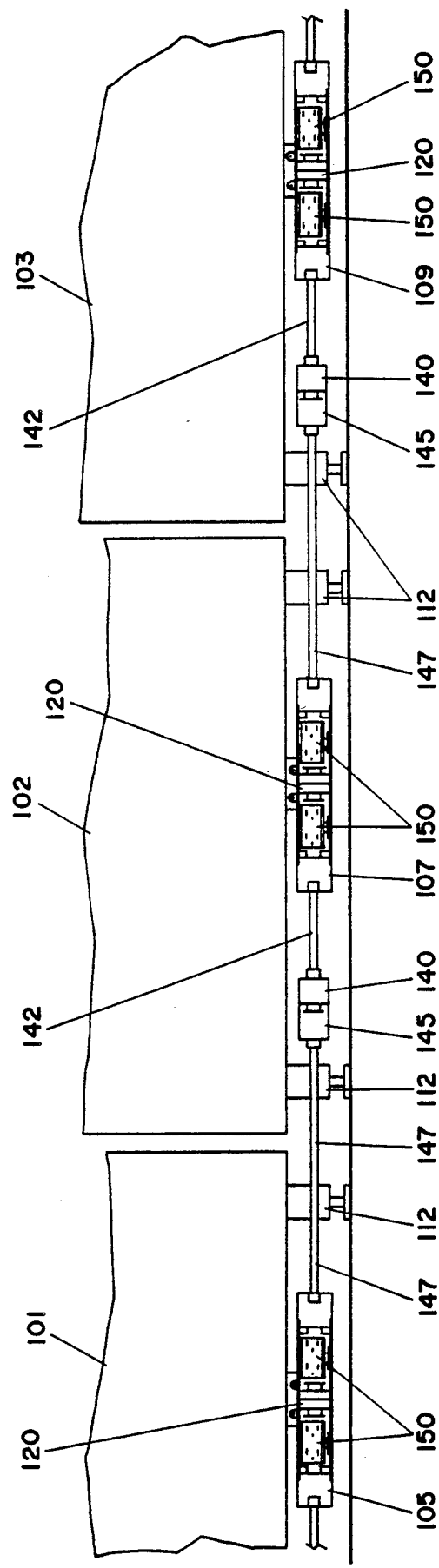
FIG. 1 is a fragmentary elevational view of a plurality of adjacent wall panels and electrical connection assemblies arranged in accordance with the invention.

FIG. 1 is a fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily used, have been omitted from the drawing in FIG. 1 to better show the electrical junction assemblies. Each of the electrical interconnection assemblies 105, 107, 109 is provided with a junction block 120, a female electrical connector block 140 and a matching male connector block 145. The connector blocks 140, 145 are connected to associated junction blocks 120 by means of conduit sections 142 and 147, respectively. Each of the junction blocks 120 is shown in FIG. 1 to be provided with a pair of electrical outlet receptacles 150. Junction blocks 120 are double sided and corresponding pairs of outlet receptacles are provided on the opposite side of each of the wall panels 101, 102 and 103 (not shown in the drawing) to allow various electrical equipments to be plugged into the outlets from either side of the panel.

Figure 2:
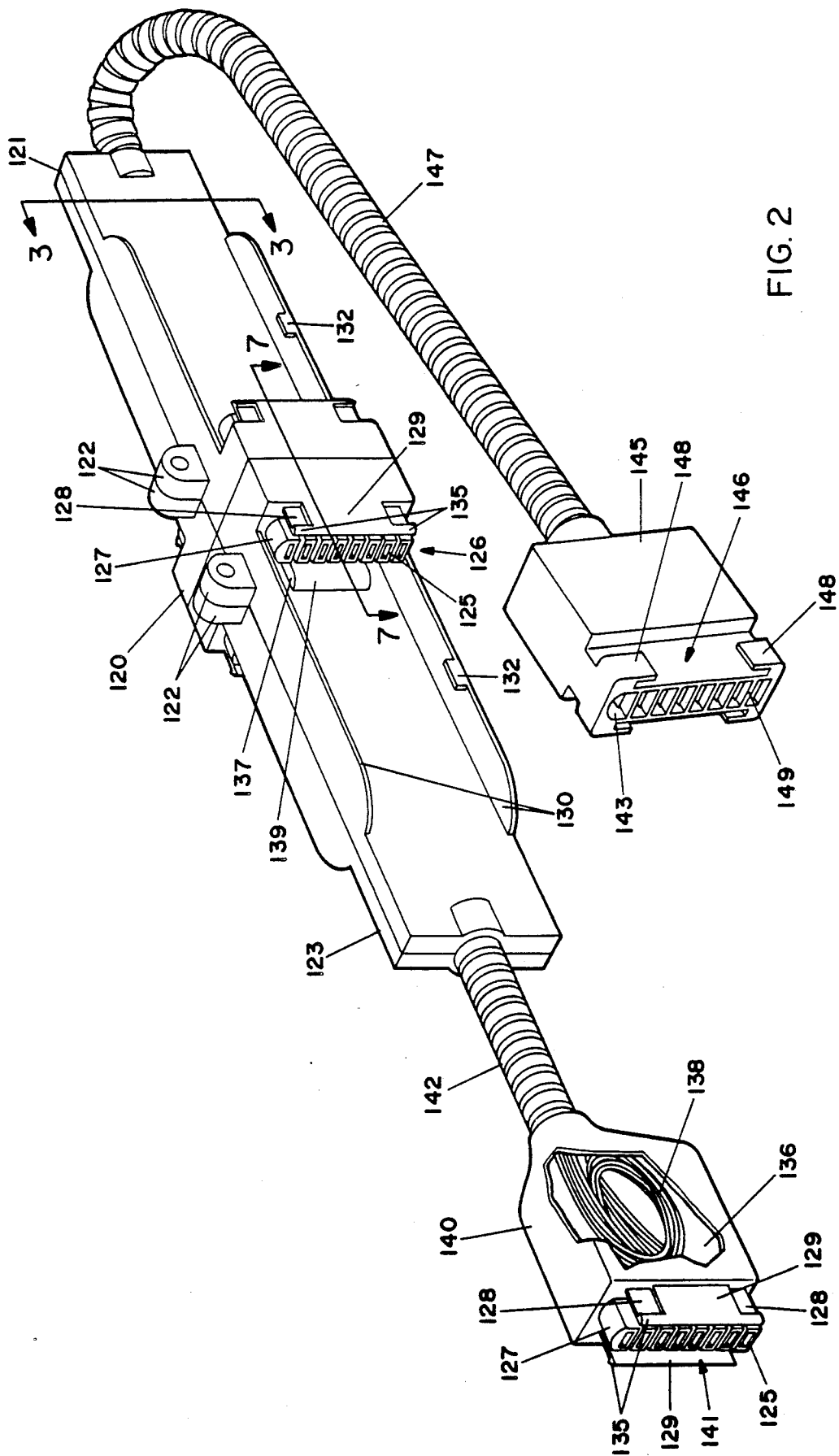
FIG. 2 is an enlarged perspective view of one of the electrical interconnection assemblies of FIG. 1.

FIG. 2 is an enlarged perspective view of one of the electrical interconnection assemblies, for example assembly 107. The junction block 120 is provided with support lugs 122 by which the junction block is supported by standard fasteners extending through support tabs extending from the bottom edge of the wall panel, e.g., wall panel 102. Junction block 120 comprises an elongated housing having opposing ends 121 and 123 and a symmetrical center section comprising four female receptacle connectors 126. Only one of the receptacle connectors 126 is fully exposed in FIG. 2. There is a pair of connectors 126 on each side of the housing and the connectors on each side face in opposite directions. Support flanges 130 are provided adjacent each of the female connectors to provide support for electrical outlet receptacles engaged with the connectors 126. In this manner, junction block 120 is adapted to support four electrical outlet receptacles, two on each side of a wall panel to which junction block 120 is attached. The junction block assembly further comprises end connector block 140, provided with a female connector 141, and connected via a standard electrical conduit 142, which may be a flexible conduit, to end 123 of junction block 120. Similarly, connector block 145, provided with a male connector 146 is connected via flexible conduit 147 to end 121 of junction block 120. In a straight line connection arrangement, as depicted for example in FIG. 1, wherein a plurality of panels are positioned adjacent each other, electrical power is transmitted between panels by connection of male connector block 145 to female connector block 140 of the adjacent junction assembly.

Electrical power is transmitted through the junction assembly by means of electrical wires disposed in the conduits 142, 147, terminated on connectors 141 and 146, respectively, and connected to receptacle connectors 126 in junction block 120. Accordingly, electrical power is transmitted through interconnecting panels and is at the same time made available at electrical outlet receptacles in each panel. Conduit 147, provided with the male connector block 145, may be a fixed-length conduit and conduit 142 may be of a length such that female connector block 140 is positioned at substantially the same distance from the panel edge in each panel independent of the width of the panel. Thus, female connector block 140 will always be accessible to male connector block 145 independent of the width of the panels. To accommodate panels of different widths, conduit 142 may be an expandable flexible conduit, such as are well known in the art. In that case, connector block 140 may be provided with an inner spatial area 136, as shown in a partially broken-away view in FIG. 2. The inner spatial area 136 is provided for storage of excess length of electrical wiring 138 in a coiled or other configuration. The excess length of electrical wiring 138 may be withdrawn when conduit 142 is expanded to an extended length. This arrangement is similar to that disclosed in my earlier patent, U.S. Pat. No. 4,579,403 (dated Apr. 1, 1986) and entitled ELECTRICAL JUNCTION ASSEMBLY WITH ADJUSTABLE CONNECTORS.

Figure 4:
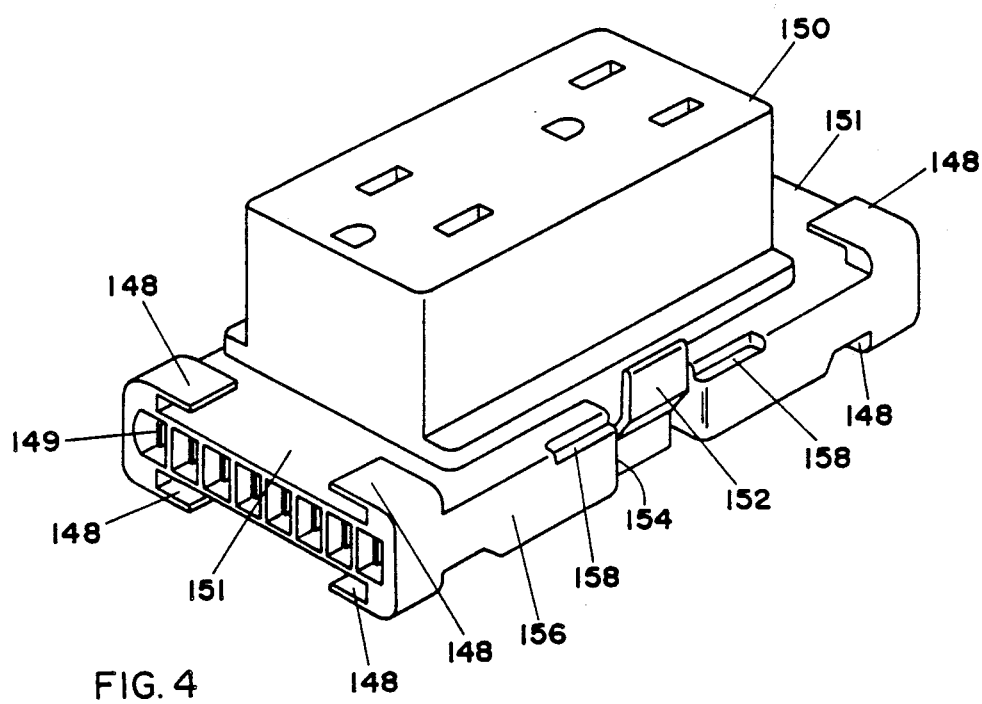
FIG. 4 is an enlarged perspective view of an outlet receptacle shown in FIG. 1.

The conduit 147 is preferably a flexible conduit which may be bent to accommodate a connection to adjacent panels which are disposed at angular positions with respect to each other, rather than in a straight line. The junction assemblies of this invention readily accommodate an arrangement in which three or more panels are disposed in an intersecting relationship, as will be discussed further herein with respect to FIG. 6. In such a configuration, the male connector block 145 of one of the panels may be connected to one of the female receptacle connectors 126 of a junction block assembly in an adjacent wall panel. For this purpose, the female connector 141 of connector block 140 and female receptacle connectors 126 on junction block 120 have been made identical. Similarly, the male connector 146 on connector block 145 has been made identical to the male connector of electrical outlet receptacle 150, shown in FIG. 1. Greater detail of the receptacle 150 is shown in FIG. 4 and is described below. As may be seen from FIG. 2, the female connectors 126 and 141 are each provided with a pair of side flanges 129 having upper and lower recessed areas 128, for engagement with flanges 148 of a male connector to provide a locking arrangement. Flanges 129, which are made of a resilient plastic material and formed integral to the housing to which they are connected, are provided with an outwardly extending inclined end surface 135. When surfaces 135 are engaged by flanges such as flanges 148 of connector 146 on connector block 145, the flanges 129 will be deflected inward, allowing flanges 148 of the male connector to engage recesses 128 to provide a locking engagement of the male and the female connectors. A protuberance 137 is provided with a generally rounded edge surface 139 and acts as an entry guide as a male connector is engaged in female connector 126. The female connectors 126, 141 are each provided with a plurality of female connector terminals 125 and a key lug 127. Male connector 146 is provided with a plurality of male connector terminals 149 and an opening 143 for receiving key lug 127.

Figure 5:
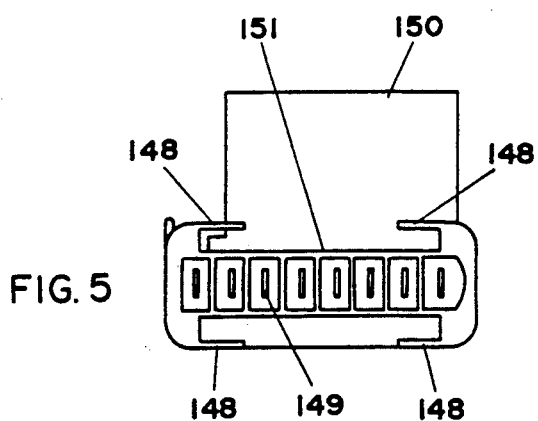
FIG. 5 is a side elevation of the outlet receptacle of FIG. 4.

The electrical outlet receptacle 150, shown in FIG. 4, is provided with male connectors 151 at both ends, allowing the receptacle to be plugged into any one of the four female receptacle connectors 126 of junction block 120. As shown in FIG. 2, junction block 120 is provided with upper and lower support flanges 130 to support receptacles 150 in each of the four female connectors 126. The lower support flanges 130 are provided with a locking flange 132. The receptacle 150 is provided with a spring latch 152 disposed in recess 154 in the surface 156 of receptacle 150. Surface 156 engages one of the lower support flanges 130 when the receptacle 150 is installed in the junction block 120. The locking flange 132 will be aligned with the recess 154 when the receptacle 150 is inserted between flanges 130, causing the spring latch 152 to be depressed. The receptacle 150 may then be moved to either the left or to the right to engage one of the female connectors 126. Recesses 158 are provided in receptacle 150 to accommodate locking flange 132 and movement to either the left or the right by a sufficient distance will cause the spring latch 152 to be moved past locking flange 132, causing the spring latch 152 to return to its extended position. Hence, receptacle 150 will be retained in a locked position. The receptacle may be removed by depressing spring latch 152 and sliding the receptacle 150 to either left or right to align the locking flange 132 with recess 154. FIG. 5 is a right-hand elevation of receptacle 150 showing right-hand male connector 151.

Figure 3:
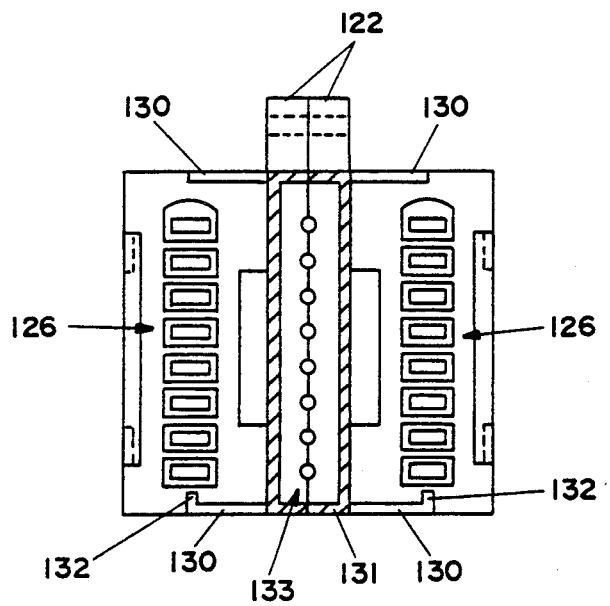
FIG. 3 is a cross-sectional view taken along line 3—3 of FIG. 2.

FIG. 3 is a cross-sectional view of junction block 120 taken along line 3—3 of FIG. 2. FIG. 3 shows two of the four receptacle connectors 126 of connector block 120. One of the two connectors 126 shown in FIG. 3 is disposed on each side of the central housing section 131, which contains a plurality of wires 133. An eight-wire system is shown in this illustrative embodiment. Each of the male and female connectors are provided with eight separate terminals, and eight separate electrical wires 133 extend through the connector blocks 140, 145, the conduits 142, 147 and the central section 131 of the junction block 120. By way of example, these may include two ground terminal wires, three neutral wires and three positive wires representing three separate circuits, with a shared ground for two of the circuits. Similarly, 10- or 12-wire systems may be readily accommodated, having corresponding numbers of terminals on each of the connectors and providing a greater number of separate circuits. The four female receptacle connectors 126 are each connected to the wires 133 by means of a plurality of contact blades, described later herein with respect to FIGS. 7 and 8. Each wire, together with the connector block terminals and receptacle connector terminals to which it is connected, is referred to herein as a circuit element. A particular circuit may be selected for use by one of the receptacles 150 by appropriate wiring connections internal to the receptacle. Since all of the circuits are connected to each one of the receptacle connectors 126 of junction block 120, a connector block 145 of an adjacent panel, equipped with a male connector, may be connected to any one of the receptacle connectors 126. In this manner, electrical power may be provided to receptacle connectors in junction block 120 and to associated connector blocks 140, 145 and hence to any adjacent panels to which these connectors may be connected. Similarly, a connector block 145 equipped with a male connector connected to one of the female connectors 126 may receive electrical power for distribution to a panel to which the connector block 145 belongs. Such interconnecting arrangements are described further herein with respect to FIG. 6.

Figure 7:
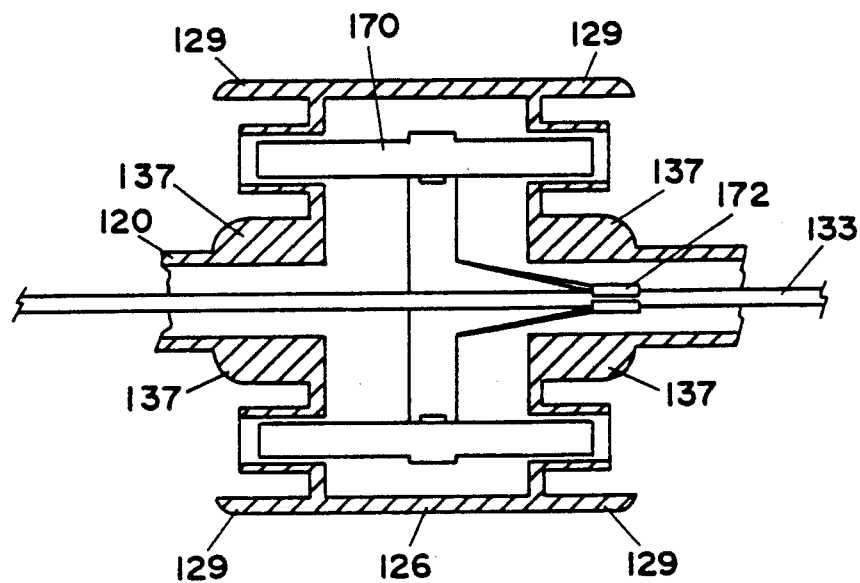
FIG. 7 is a fragmentary cross-sectional view along line 7—7 of FIG. 2.
Figure 8:
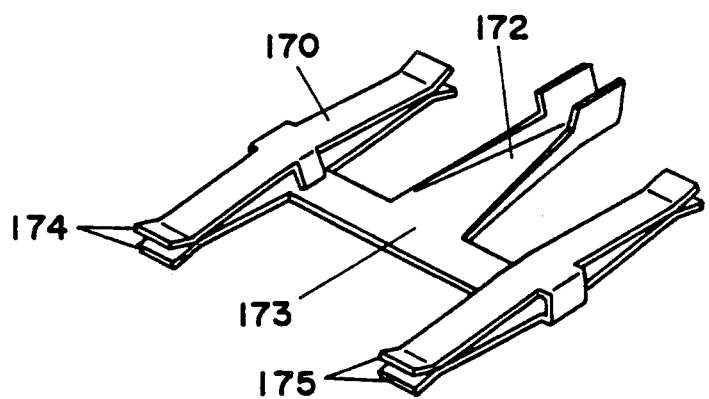
FIG. 8 is a perspective view of a receptacle contact blade shown in FIG. 7.

FIG. 7 is a fragmentary cross-sectional view along line 7—7 of FIG. 2. Shown in FIG. 7 is a contact blade structure 170 which is one of eight such blades disposed in central housing section 131. Each such blade is in electrical contact with one of the conductors 133. Connection to conductor 133 is made by means of a crimped connection of blade extension member 172 to conductor 133. As may be more readily seen from the perspective view of FIG. 8, the extension member 172 is part of a center section 173 which is connected to left-hand upper and lower contact blades 174 and right-hand upper and lower contact blades 175. The upper and lower contact blades on each side form the female opening part of the connector 126 for engagement with blades of a male connector.

Figure 6:
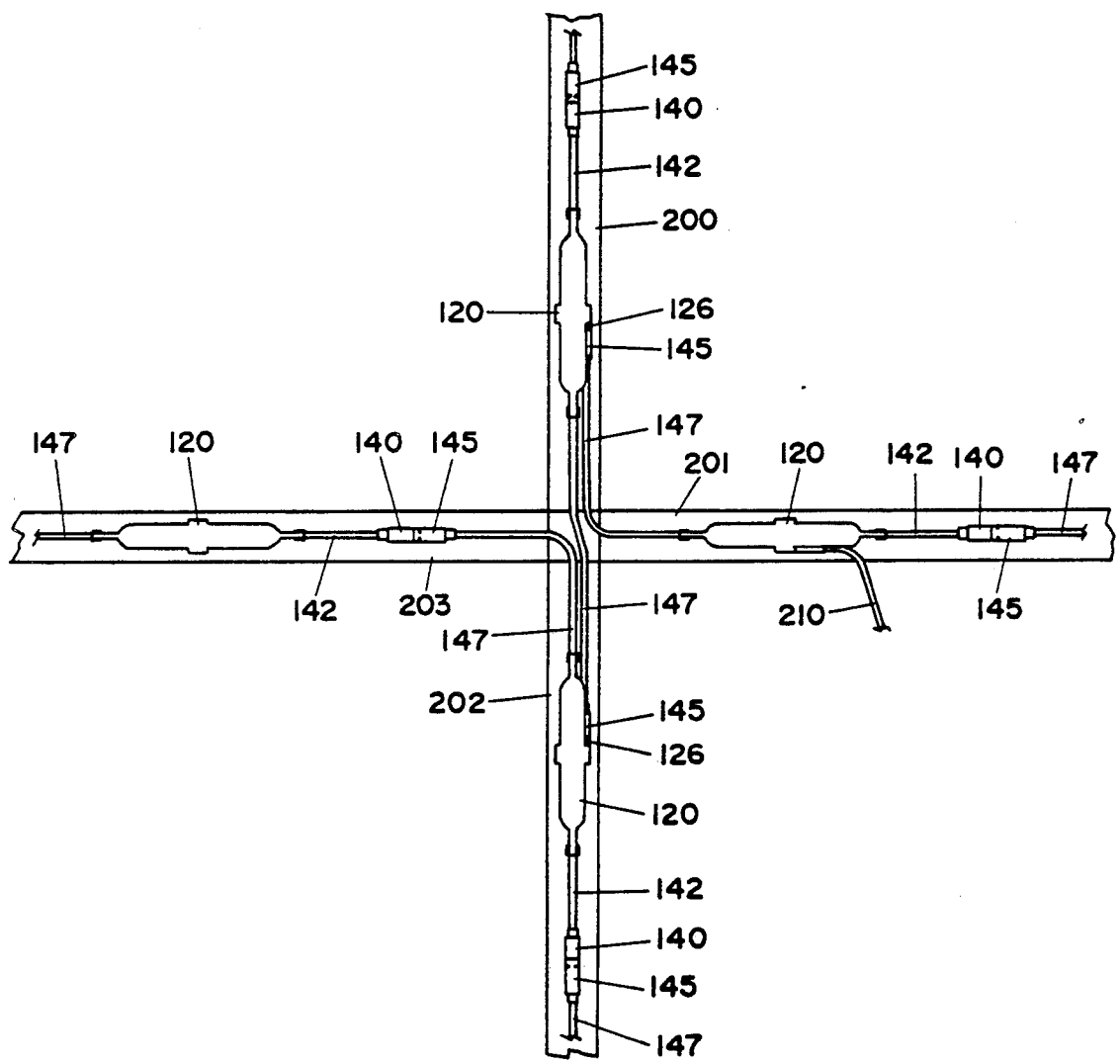
FIG. 6 is a fragmentary plan view of raceway areas of four wall panels, illustrating wall panel interconnections in accordance with the invention.

FIG. 6 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Furthermore, the invention is equally applicable to a three-panel configuration or a five-panel configuration disposed at various angles. FIG. 6 represents the raceway portions of four panels 200, 201, 202, and 203 disposed at right angles to each other. Each of the four panels is provided with an interconnection assembly, as shown in FIG. 2, comprising a junction block 120, a male connector block 145, and a female connector block 140 attached to the junction block 120 by means of flexible conduits 147 and 142, respectively. The junction block 120 is disposed within each panel raceway near one edge of the panel. Panels 200, 201, 202 are positioned such that the end at which these panels are joined to other panels is the end near which the junction block 120 is positioned. One of the panels, panel 203, is positioned with an opposite orientation in which the end near which the junction block 120 is located is positioned opposite the point of junction of the four panels. The flexible conduit 147, provided with the male connector block 145, extends beyond the end of the panel in which it is positioned, and the flexible conduit 142, provided with a female connector block 140, is terminated just short of the end of the panel. Thus, as is also shown in FIG. 1, a connection is made between panels by extending the flexible conduit 147 with male connector block 145 into the raceway area of the adjacent panel to engage the female connector block 140 at the end of flexible conduit 142. In the configuration of FIG. 6, the male connector block 145 of panel 202 and its associated flexible conduit 147 extend into the raceway area of panel 202 to engage female connector block 140 of panel 203. It will be apparent that the connection as shown between panel 202 and 203 may be made whenever these panels are adjacent and independent of the angle at which the panels are disposed with respect to each other. In the configuration of FIG. 6, the flexible conduit 147, with its male connector block 145, associated with the panel 200 are extended into the raceway area of panel 202 for engagement with one of the female receptacle connectors 126 of junction block 120 in panel 202. In this manner, an electrical connection is established among the junction blocks of the three panels 200, 202, and 203. Thus, electrical power provided from an external source to any one of these three may be distributed to the other two by means of the connection arrangement shown by way of example in FIG. 6. In the arrangement of FIG. 6, flexible conduit 147 and its male connector block 145 of panel 201 is connected to one of the female connectors 126 of junction block 120 of panel 200 thereby establishing an electrical connection between panels 200 and 201. This connection, in combination with the other connections shown in FIG. 6 and described in the previous sentences, completes an arrangement for establishing an electrical connection from any one of four panels to the entire four-panel configuration. Additional connections may be envisioned by connections of male connectors 145 from other panels into additional ones of the female receptacle connectors 126 of the junction blocks 120 of any of the panels 201 through 203, should one choose to provide an arrangement of more than four intersecting panels. Furthermore, additional conduits, such as conduit 210 shown in FIG. 6, may be connected by means of a male connector to any of the receptacle connectors 126 to provide electrical power to lamps or other fixtures. As can be seen, a great deal of flexibility has been achieved by the electrical junction assembly in accordance with this invention.

It will be understood that the embodiments disclosed herein are only illustrative of the invention and numerous other arrangements may be devised by those skilled in the art without departing from the spirit and scope of the invention.

What is claimed is:

1. A space-divider wall system for defining work areas and comprising a plurality of adjacent upright wall panels having end edges and disposed in an arrangement whereby first and second of said wall panels are joined to one end edge of a third of said wall panels, said wall system comprising:

an electrical raceway area in each of said panels extending between opposite said end edges of said wall panels;

a junction block disposed in said raceway area of each of said panels and each junction block comprising a plurality of electrical receptacle connectors having a first predetermined terminal connection arrangement for pluggably engaging electrical outlet receptacles having a second predetermined terminal arrangement;

a first connector having said first predetermined terminal connection arrangement connected to each of said junction blocks and a second connector having said second predetermined terminal connection arrangement connected to each of said junction blocks;

said first connector connected to said junction block in said first wall panel pluggably engaging said second connector connected to said junction block in said second wall panel, and said second connector connected to said junction block in said third panel pluggably engaging said receptacle connector of a selected one of said first and said second panels;

said receptacle connectors and said first and second connectors each comprising a plurality of terminals representing a plurality of electrical circuit elements, terminals of said first connectors being connected to associated said junction blocks by means of a plurality of first conductors and terminals of said second connectors connected to associated said junction blocks by means of a plurality of second conductors;

individual conductors of said plurality of first conductors and said plurality of second conductors of corresponding like electrical circuit elements of said first and second connectors being interconnected and connected to corresponding like electrical circuit elements of said receptacle connectors;

each of said junction blocks comprising a plurality of metallic contact blade structures each having a plurality of blades corresponding in number to said plurality of electrical receptacle connectors in said junction blocks and a connection section in electrical contact with one of said conductors;

said first and second conductors of corresponding like electrical circuit elements comprising a single conductor extending from a terminal of one of said first connectors to a corresponding contact blade structure and a corresponding terminal of one of said connectors.

2. An electrical interconnection assembly for use in a space-divider wall system including a plurality of modular upright wall panels having vertically extending opposite end edges and a raceway area extending between said opposite edges for supporting electrical conductors and junction blocks, said assembly adapted to be mounted in said raceway and comprising:

a junction block comprising a junction block housing having oppositely extending ends, oppositely facing side walls and an enlarged midsection extending laterally beyond said side walls, said midsection comprising a pair of oppositely directed receptacle connectors on each of said side walls for engaging a first pair of electrical outlet receptacles along one of said oppositely facing side walls and a second pair of electrical outlet receptacles along the other of said oppositely facing side walls, said receptacle connectors each having a first predetermined terminal connection arrangement for engagement with a connector having a second predetermined terminal connection arrangement;

a first end connector having said first predetermined terminal connection arrangement and electrically connected to one end of said junction block;

a second end connector having said second predetermined terminal connection arrangement and electrically connected to an opposite end of said junction block;

at least one metallic contact blade structure having a plurality of blades, one of said blades being in each of said receptacle connectors in said midsection; and a single conductor extending between said first and second end connectors and said at least one contact blade structure.

3. A junction block assembly for use in a space-divider wall system, comprising:

a junction block comprising an electrical receptacle connector having a first predetermined terminal connection arrangement for pluggably engaging an electrical outlet receptacle having a second predetermined terminal arrangement;

a first connector having said first predetermined terminal connection arrangement connected to one end of said junction block and a second connector having said second predetermined terminal connection arrangement connected to an opposite end of said junction block;

said receptacle connector and said first and second connectors each comprising a plurality of terminals representing a plurality of electrical circuit elements, said terminals of said first connector connected to said terminals of said second connector by means of a plurality of conductors extending into said junction block, individual conductors of said plurality of conductors interconnecting terminals of corresponding like electrical circuit elements in said first and second connectors and terminals of corresponding like circuit elements in said receptacle connector;

said conductors interconnecting terminals of corresponding like electrical circuit elements each comprising a single conductor extending from a terminal of one of said first connectors to a corresponding receptacle connector terminal and to a corresponding terminal of one of said second connectors.

4. The junction block assembly in accordance with claim 3 and comprising a plurality of receptacle connectors each having said first predetermined terminal connection arrangement, each arrangement comprising a plurality of terminals representing a plurality of electrical circuit elements, said assembly further comprising a plurality of contact blade structures each comprising at least one blade in each of said receptacle connectors and wherein a single said conductor interconnects one of said contact blade structures and a corresponding terminal of each of said first and said second connectors.

5. In a space-divider wall system including plurality of adjacently disposed modular upright wall panels each having vertically extending opposite end edges and a raceway area extending between said edges and an electrical interconnection assembly disposed in each of said raceways, each of said assemblies comprising:

a junction block mounted at a predetermined position in each of said raceways and comprising a junction block housing having oppositely extending ends and oppositely extending side walls and an enlarged midsection extending laterally beyond said side walls, said midsection comprising a pair of oppositely directed receptacle connectors on each of said side walls, said receptacle connectors each having a first predetermined terminal connection arrangement for engagement with a connector having a second predetermined terminal connection arrangement;

a first end connector having said fist predetermined terminal connection arrangement;

a second end connector having said second predetermined terminal connection arrangement;

a first conduit section connected between said first end connector and one of said ends of said housing and having a length less than required to extend said first end connector to one of said wall panel end edges;

a second conduit section connected between said second end connector and an opposite end of said housing, opposite said one end, and having a length sufficient to extend said second end connector beyond an opposite wall panel end edge, opposite said one wall panel end edge, and extending into said raceway of one of said adjacent wall panels for connection with a selected one of said first end connector and a receptacle connector of one of said electrical interconnection assemblies disposed in said one of said adjacent wall panels.

6. A space-divider wall system in accordance with claim 5 and comprising at least three separate wall panels arranged such that one edge of a first of said three panels is disposed adjacent one edge of each of a second and a third of said three panels, said first end connector in said first of said panels connected to said second end connector in said second of said panels and said second end connector in said third of said panels connected to one of said receptacle connectors in said second of said panels.

7. The system in accordance with claim 5 and comprising at least four separate wall panels arranged such that one edge of one of said four panels is disposed adjacent one edge of each of a second and a third and a fourth of said four panels, said first end connector in said first of said panels connected to said second end connector in said second of said panels and said second end connector in said third of said panels connected to a receptacle connector in said second of said panels and said second end connector in said fourth of said panels connected to a receptacle connector in said third of said panels.

* * * * *

UNITED STATES PATENT AND TRADEMARK OFFICE
CERTIFICATE OF CORRECTION

PATENT NO. : 5,096,434
DATED : March 17, 1992
INVENTOR(S) : NORMAN R. BYRNE

It is certified that error appears in the above-identified patent and that said Letters Patent is hereby corrected as shown below:

```
Col. 8, claim 1, line 48:
     after "said" insert --second--.

Col. 10, claim 5, line 19:
     "fist" should be --first--.
```

Signed and Sealed this

Twentieth Day of July, 1993

Attest:

MICHAEL K. KIRK

*Attesting Officer*   *Acting Commissioner of Patents and Trademarks*